United States Patent [19]

Watanabe

[11] Patent Number: 4,837,737
[45] Date of Patent: Jun. 6, 1989

[54] SYSTEM FOR DETECTING ORIGIN OF PROPRIETARY DOCUMENTS GENERATED BY AN APPARATUS FOR PROCESSING INFORMATION SUCH AS WORDS, FIGURES AND PICTURES

[76] Inventor: Toshiaki Watanabe, 19-11, Kichijojiminami-Cho 3-Chome, Musashino City, Japan

[21] Appl. No.: 892,281

[22] Filed: Aug. 4, 1986

[30] Foreign Application Priority Data

Aug. 20, 1985 [JP] Japan ................................ 60-180906

[51] Int. Cl.⁴ ...................... G06F 5/00; G06F 15/62; G06F 3/023; B41J 1/31
[52] U.S. Cl. .................................. 364/900; 340/735; 380/55; 380/51; 380/42; 380/25; 400/61; 400/76; 400/83
[58] Field of Search ... 364/200 MS File, 900 MS File; 340/735; 380/55, 51, 42, 25; 400/61, 76, 83

[56] References Cited

U.S. PATENT DOCUMENTS

| 2,791,310 | 6/1952 | Jones | 380/55 X |
|---|---|---|---|
| 3,999,167 | 12/1976 | Ito et al. | 400/110 |
| 4,013,894 | 3/1977 | Foote | 235/379 |
| 4,313,031 | 1/1982 | Widmer | 380/42 X |
| 4,316,188 | 2/1982 | Cancasci, Jr. | 340/735 |
| 4,350,844 | 9/1982 | Stürzinger et al. | 380/51 X |
| 4,382,702 | 5/1983 | Fessel | 400/144.2 |
| 4,389,641 | 6/1983 | Nakanishi et al. | 340/709 |
| 4,566,002 | 1/1986 | Miura et al. | 340/727 |
| 4,630,947 | 12/1986 | Yoshida et al. | 400/124 |
| 4,637,051 | 1/1987 | Clark | 382/1 |
| 4,655,622 | 4/1987 | Aoki | 400/121 |
| 4,682,161 | 7/1987 | Bugg | 340/731 |
| 4,695,172 | 9/1987 | Ueno et al. | 400/83 |
| 4,703,323 | 10/1987 | Troupes et al. | 340/790 |
| 4,723,149 | 2/1988 | Harada | 355/14 R |
| 4,739,377 | 4/1988 | Allen | 355/133 |
| 4,770,551 | 9/1988 | Bradford | 380/55 X |

Primary Examiner—Archie E. Williams, Jr.
Assistant Examiner—Danh Phung
Attorney, Agent, or Firm—Parkhurst, Oliff & Berridge

[57] ABSTRACT

A word processor includes a work station having a keyboard and a display device, a main unit for forming a text file in accordance with input commands entered by the keyboard, an external memory unit for storing the text file, a standardized character memory for storing dot patterns of characters having standardized style, a modified character memory for storing dot patterns of characters having modified style, and a printer for printing out a document in accordance with the text file. When a plurality of documents to be delivered to different addresses are formed in accordance with the same text file, different characters in respective documents are replaced by modified characters to form text files having different modified characters. Then the plurality of documents are printed in accordance with respective text files having different modified characters, so that these documents can be distinguished from one another.

19 Claims, 6 Drawing Sheets

Normal Character: G Y i K X

Modified Character: G Y i K X

Normal Character: word processor

Modified Character:
- word processor
- word processor
- word processor
- wor d processor
- word processor

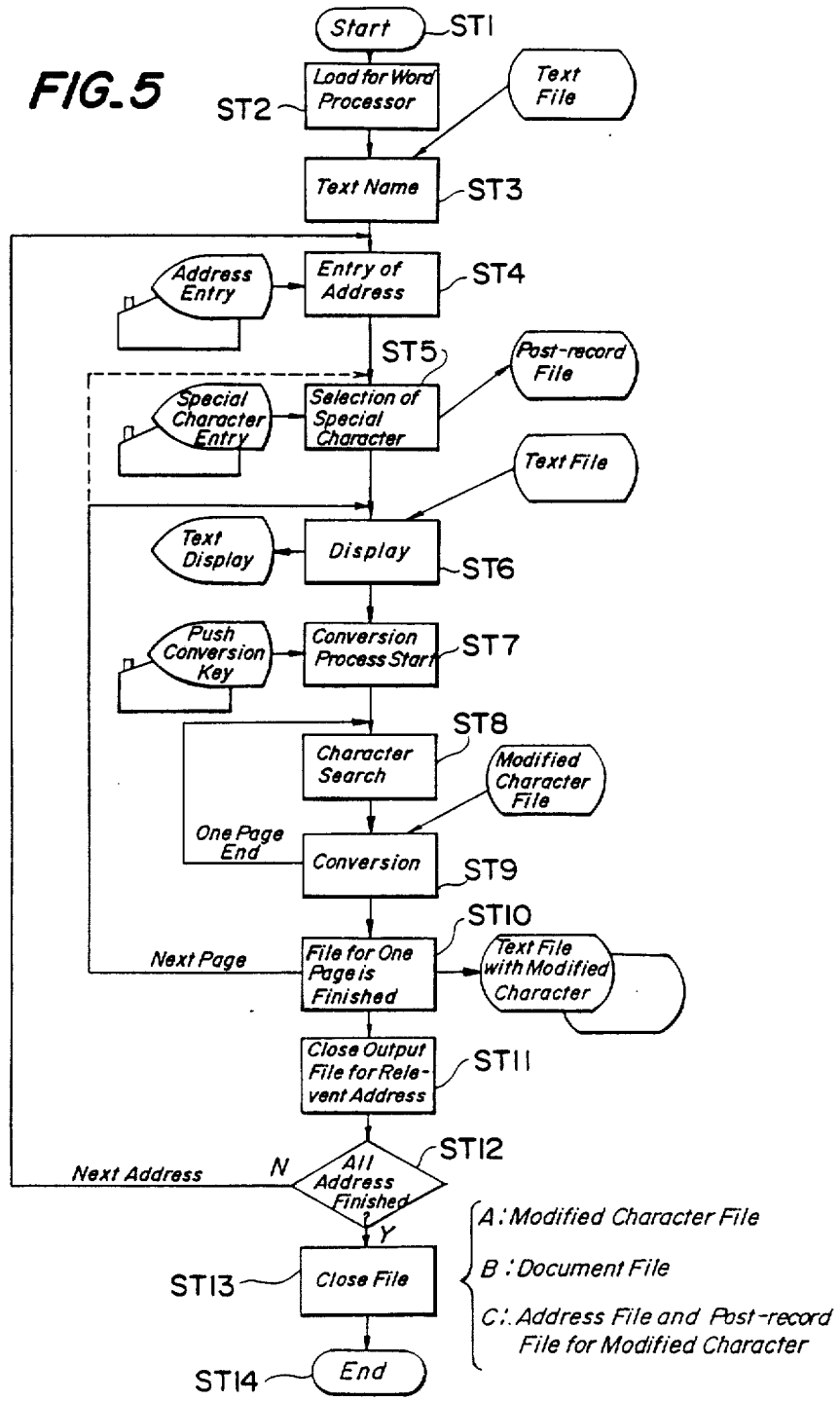

4,837,737

SYSTEM FOR DETECTING ORIGIN OF PROPRIETARY DOCUMENTS GENERATED BY AN APPARATUS FOR PROCESSING INFORMATION SUCH AS WORDS, FIGURES AND PICTURES

BACKGROUND OF THE INVENTION

1. Field of the Invention

The present invention relates to an apparatus for processing information such as words, figures and pictures.

2. Description of the Related art

An apparatus for processing words has been Known and practiced typically as a word processor. The Known word processor comprises a first memory for storing character information such as letters, numbers, marks and symbols, an input device for entering selection commands selecting the character information in accordance with a text to be composed, a display for reading letters, numbers, marks and symbols denoted by said selection commands out of said first memory and displaying the thus read out letters, numbers, marks and symbols, a second memory for storing text information composed of the selected letters, numbers, marks and symbols, and an output device for reading the text information out of said second memory as an output.

For the sake of simplicity, the letters, numbers, punctuation marks and other typographical symbols are sometimes called "characters".

In general, the first memory for storing the character information comprises a read only memory (ROM) in which a number of dot patterns representing various letters, numbers, marks and symbols have been previously stored. In general, these dot patterns are formed as standardized character style. The input device generally comprises a keyboard and a display device. The keyboard includes character keys such as letter keys, number keys, punctuation mark keys and other typographical symbol keys, and function keys such as return key, backspace key, repeat key, tab (tabulator) key, tab set ket, decimal tab key, alignment keys and control key. Sometimes use may be made of a device for entering hand-written characters or a device for entering speech information of an operator. The output device generally comprises a printer for forming hard prints. The output device may comprise a device for transmitting the text informastion over a transmission path as a data signal or a device for recording the text information on a record medium such as floppy disc and magnetic tape.

As explained above, in the known word processor, the character information has been previously stored as the characters having standardized style. Usually there is further provided a faculty for forming and registering special letters, marks and symbols formed by a user. This faculty is sometimes called the external-word registration. The external-word entered by the user is considered to be an additional word to the standardized charcters. Therefore, once a text has been formed by using the standardized and additional characters, any desired number of documents having the same content can obtained. In the other words, when the text information has been stored in the second memory the text can be respectedly read out and a plurality of documents composed of the same characters, numbers, punctuation marks and other symbols can be printed. This feature is very important for the word processor particularly in case of delivering a plurality of documents having the same content to different receivers. However, in the known word processor, it is impossible to distinguish the documents having the same content from one another unless each documents have respective addresses. Similarly it is impossible to distinguiush a plurality of documents having the same content which are printed by the same word processor on different days. In this manner, heretofore, a plurality of documents having the same content and printed by the word processor in accordance with the same text information stored in the second memory could not be distinguished from one another. This make it more difficult to protect proprietary information or secure secret documents. Therefore, when a document might be transferred to third parties such as competitors, other organizations, other political parties, newsmen, resporters and information collecting agents, or when a document is duplicated, it is quite difficult to find a rout through which the secret was leaked out. In general, in case of duplicating a secret document, any address thereon is hidden and thus it is hardly possible to identify an original document from which the duplicated copy is formed. In the modern information-oriented society, the divulgence of classified information has become a serious social problem and it has become much more important how to keep or manage the classified information. Nowadays, since there have been developed machines which can form a plurality of documents having the same text, there is a great chance that confidential documents might be leaked out. Therefore, there has been earnestly desired to develop a positive measure for avoiding the divulgency of confidential documents.

SUMMARY OF THE INVENTION

The present invention has for its object to provide a novel and useful information processing apparatus by means of which a plurality of documents composed of the same text can be easily and positively distinguished from one another, while the content of the text is not changed or deteriorated at all.

According to the invention, an apparatus for processing information such as words, figures and pictures comprises a first memory for storing character information such as letters, numbers, punctuation marks, symbols, figures and pictures; an input device for entering selection commands for the character information in accordance with a text to be formed; a display for reading characteres denoted by the selection commands out of said first memory and for displaying the thus read out characters; a second memory for storing text information composed of the read out and displayed characters; an output for outputting the text information stored in device the second memory and a conversion device for changing selectively a configuration of at least one character in the text information without altering a content of said text information.

In the information processing apparatus according to the invention, in the case of printing a plurality of documents in accordance with the same text information, but to be delivered to different addresses a configuration of one or more characters such as shape style, position or orientation and arrangement, is changed for respective documents. Therefore, it is possible to identify addresses of respective documents by investigating and analyzing the preterminned specific characters. That is to say, when a classified document has been leaked out, it is possible to find a source of leakage by analyzing one or more specific characters contained in the leaked document. It should be noted that the modification of configuration of characters is carried out to such an extent that the contents of the characters are not lost at all, so that the content of the text formed by the modified characters is not changed at all and the primary function of the text is not affected.

BRIEF DESCRIPTION OF THE DRAWINGS

FIGS. 4A and 4B are schematic views showing several embodiments of modified characters; and FIG. 5 is a time chart for explaining the operation of the word processor shown in FIG. 1.

DESCRIPTION OF THE PREFERRED EMBODIMENTS

Figure 1:
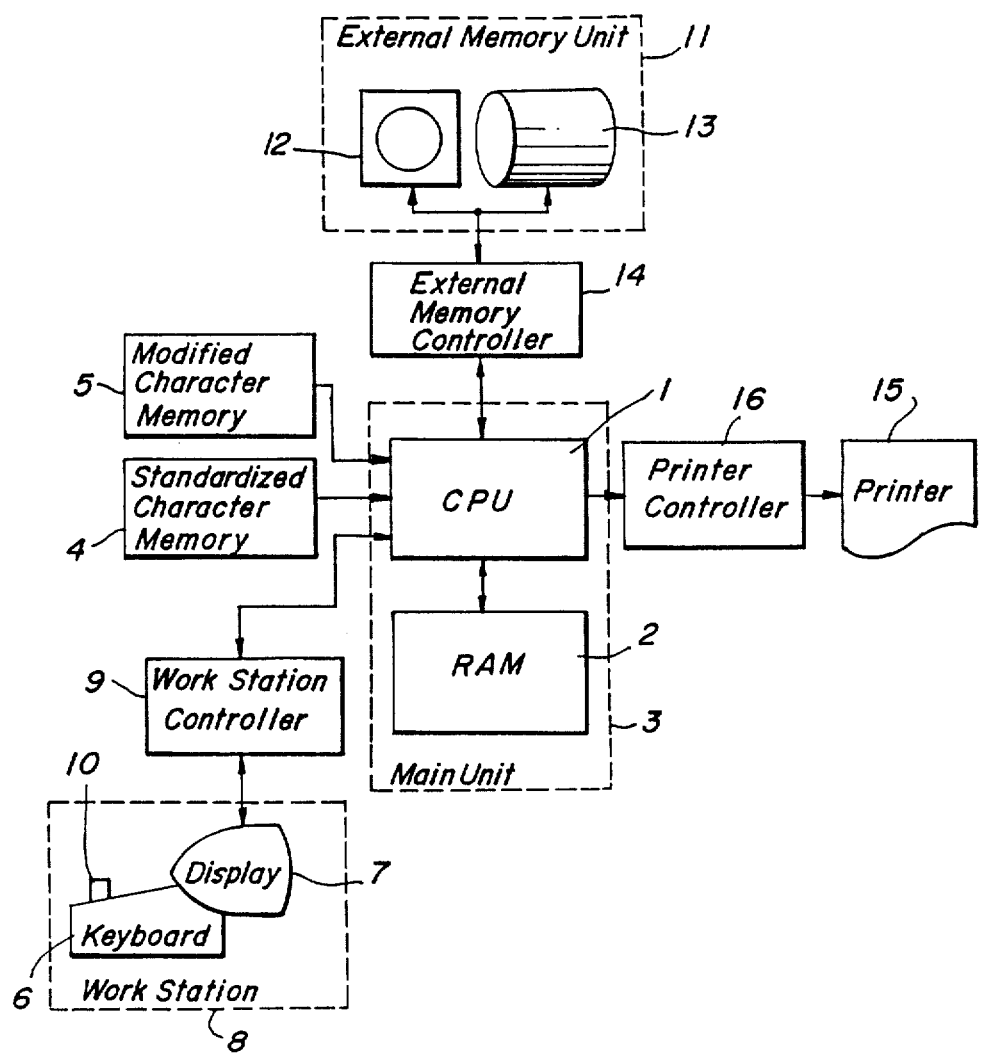
FIG. 1 is a block diagram showing a construction of an embodiment of the word processor according to the invention.

FIG. 1 is a block diagram illustrating an embodiment of the information processor according to the invention. In the present embodiment, the information processor is formed as a word processor. The word processor comprises a main unit 3 consisting of a central processing unit (CPU) 1 and a main memory unit (RAM) 2. The word processor further comprises a standardized character memory 4 for storing character information including letters, numbers, punctuation marks and other typographical symbols, and a modified character memory 5 for storing specifically modified letters, numbers, punctuation marks and symbols. In the standardized character memory 4 there have been previously stored characters having dot patterns of standardized configuration. In the modified character memory 5, dot patterns of modified characters formed by a user are stored. The standardized character memory 4 and modified character memory 5 are coupled with the CPU 1. There is further provided a work station 8 comprising a keyboard 6 and a display device 7. The work station 8 is also coupled with the CPU 1 via a work station controller 9.

Figure 2:
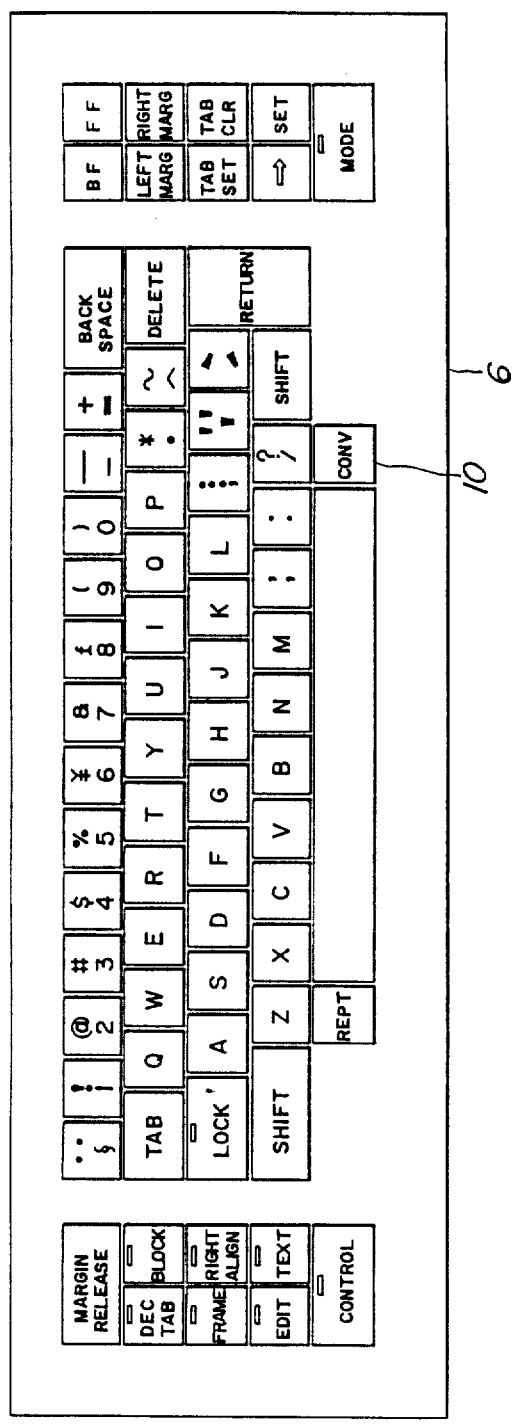
FIG. 2 is a plan view showing an embodiment of a keyboard of the word processor shown in FIG. 1.

FIG. 2 is a plan view illustrating an embodiment of the keyboard 6 provided in the work station 8. The keyboard 6 comprises character keys including letter keys, number keys, punctuation mark keys and typographical symbol keys, and function keys including return key, backspace key, repeat key, tab key, decimal tab key. By operating these keys on the keyboard 6 in a usual manner, the user can enter successively characters to form text information.

According to the invention, the keyboard 6 further comprises a conversion key 10 for converting one or more specific characters in the text information to predetermined modified characters. In FIG. 1 only the conversion key 10 is denoted on the keyboard 6.

There is further provided an external memory unit 11 for storing the text information. The external memory unit 11 includes a floppy disc device 12 and/or a magnetic disc device 13, these devices being coupled with the CPU 1 by means of an external memory controller 14. The output means comprises a printer 15 which is coupled with the CPU 1 via a printer controller 16.

Figure 3:
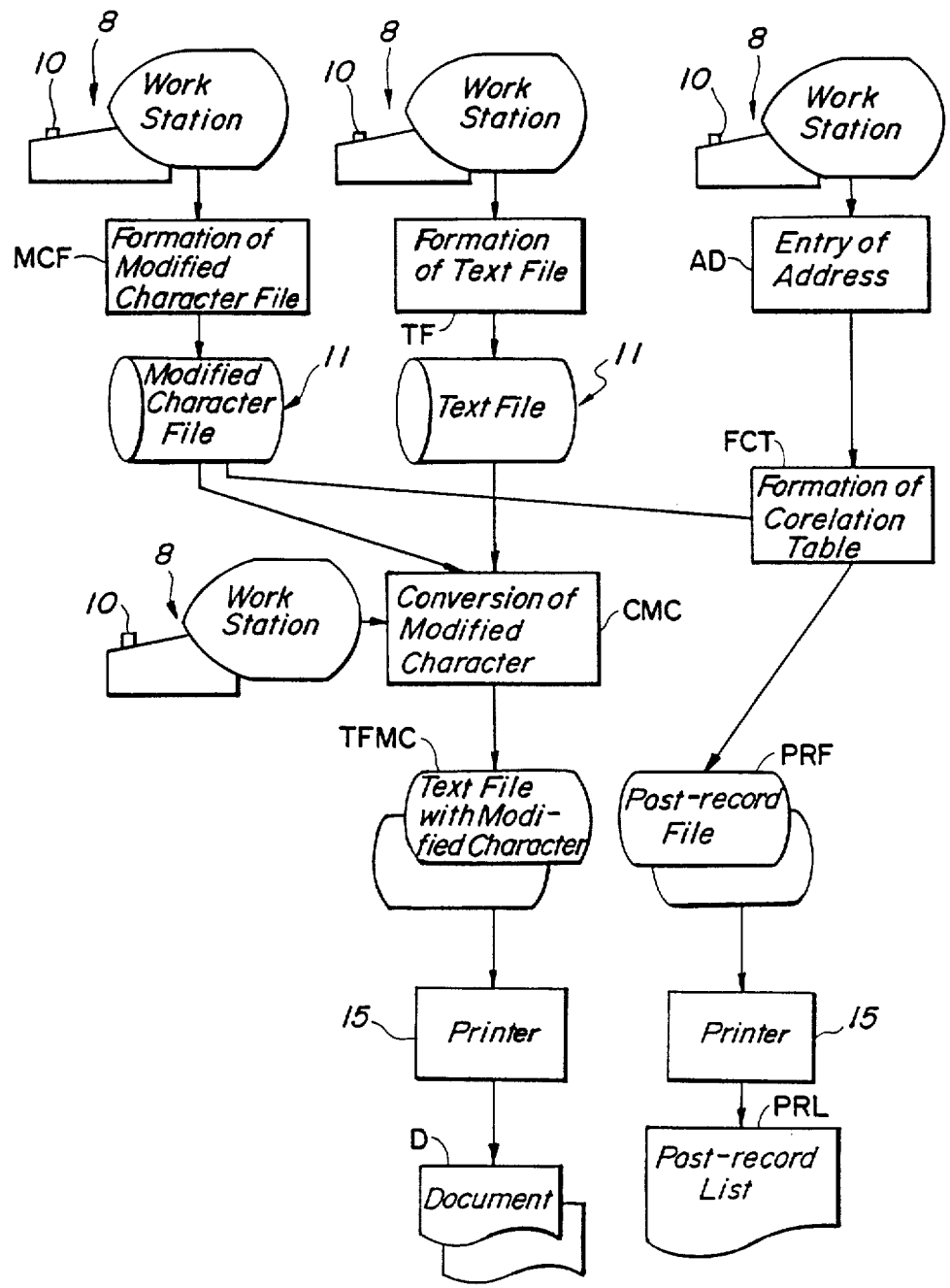
FIG. 3 is a flow chart depicting steps of forming a document in the word processor illustrated in FIG. 1.
Figure 4A:
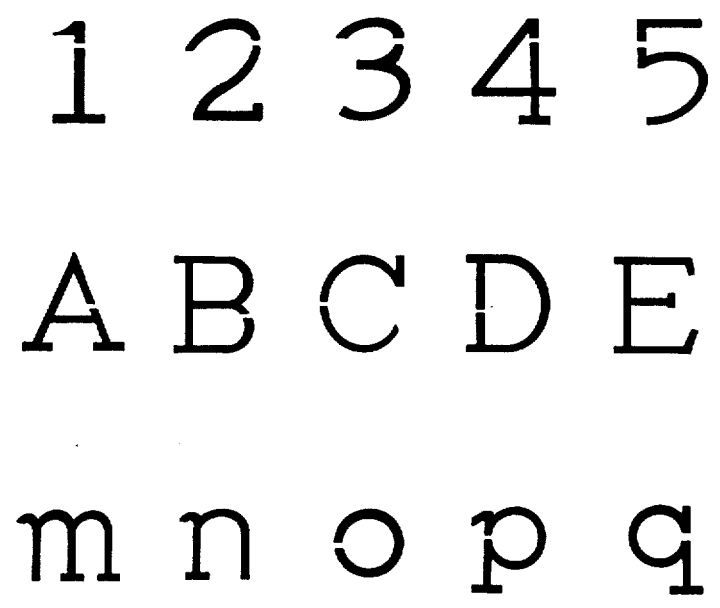

Now the operation of the above word processor according to the invention will be explained in detail with reference to a schematic view illustrated in FIG. 3. In the present embodiment, a plurality of documents D formed by the printer 15 in accordance with the same text information are distinguished from one another by replacing specific characters in the text by given modified characters. To this end, the modified characters have to be previously formed with the aid of the work station 8 and are stored in the modified character memory 5 by means of the CPU 1. This operation can be performed by a similar manner for registering external characters. FIG 4A shows several examples of modified characters according to the invention. In these examples, part of strokes forming numbers, capital letters and small ketters is deleted in such a manner that meanings of the characters are not lost or changed at all. According to the invention, the configuration of characters may be modified in various ways. For instance, punctuation marks and typographical symbols such as under line, slash and bracket may be modified by cutting or removing a part thereof.

Further, as illustrated in FIG. 4B if a character (G) to be modified includes a curved stroke, its radius of curvature may be changed, and if a character (Y) has a straight line, its inclination angle may be modified. Moreover, if a character (i) is composed of more than two elements which are separated from each other, a mutual positional relation of these elements may be altered. Further, a modified character (K) may be formed by simply adding a small branch to the normal configuration. Moreover, a thickness of curved or straight line of a character (X) may be changed to form a modified character. It should be noted that the present invention is not limited to the above examples in which the sytle of character itself is changed to form a modified character, but a position of a specific character (d) may be shifted upward, downward, rightward or leftward or a specific character (d) may be tilted with respect to adjacent normal characters also shown in FIG. 4B. According to the invention, the configuration of character may be changed in any way unless the content of a character is lost or deteriorated, but the character may be recognized as the modified one upon a careful inspection.

It should be further noted that it is not necessary to limit the number of modified characters. only to one, but a plurality of modified characters may be assigned to respective documents. In such a case, a number of combinations of a plurality of modified characters may be advantageously utilized to distinguish a large number of documents from each other. For instance, when there are prepared modified characters for all letters in alphabet, a document contains always at least one modified character.

The modified characters whose configuration is changed in the manner explained above are stored in the modified character memory 5. At the same time a modified character file MCF containing a list of all the modified characters is stored in the external memory unit 11.

Now a text is formed by operating the keyboard 6. This can be performed by pushing the keys on the keyboard 6 in the entirely same manner as usual typing with the word processor. That is to say, the character information is selected by pushing the letter keys, number keys, punctuation keys and other symbol keys. The character information thus entered is supplied to the main memory unit (RAM) 2 and is stored therein temporarily. During this operation, if one or more characters whose modified characters have been stored are selected, the modified characters have not yet been read out, but only standardized characters are selected in a usual manner. In this manner, a text file composed of selected characters is formed and is stored in the external memory unit 11.

In case of delivering a plurality of documents formed by the same text file TF to a plurality of different addresses, an address AD is entered with the aid of the work station 8. After the address has been entered, the central processing unit (CPU) 1 sends an inquiry to the operator whether the standardized characters should be replaced by or converted into modified characters or not. The inquiry is displaced on the display device 7. When the operator enters a command for the conversion, the CPU 1 inquiries once again what character or characters should be converted into modified character or characters. In response to this, the operator enters a conversion command with the aid of the keyboard 6. For instance, when characters "1" and "A" are selected as characters to be modified, the operator pushes number and letter keys of "1" and "A" on the keyboard 6 successively. Then the operator pushes the conversion key 10 on the keyboard 6 to initiate to read the relevant text file and the modified character file out of the external memory unit 11. During this read out operation, when characters "1" and "A" are found in the text file, codes or addresss of modified characters of "1" and "A" are extracted and are substituted for codes or addresses of the standardized characters "1" and "A" (see CMC in FIG. 3). In this manner, a text file including modified characters TFMC is formed and is temporarily stored in the main memory unit (RAM) 2 together with the address information. In case of effecting the printing operation at once, the standardized and modified character information are read out of the standardized characters memory 5 and modified character memory 6, respectively and are supplied to the printer 15. In this manner a document D having the address and the text composed of the standardized and modified characters is printed out. In this case, a corelation table representing a corelation between the relevant address and the modified characters is formed (see FCT in FIG. 3). At the same time a past-record file PRF is formed on the basis of the corelation file. These files are stored in the external memory unit 11. Then a past-record list PRL may be printed out occasionally.

The above operation is repeatedly effected by changing addresses and modified characters to form a plurality of documents having the same content, but different addresses and modified characters. At the same time the past-record list representing the relation between the addressess and the modified characters is formed. Therefore, when a confidential document is leaked out, it is possible to found a source from which the classified document is divulged by identifying one or more modified characters contained in the leaked document.

FIG. 5 is a flow chart showing the above operation for forming documents with different addresses and modified characters. After the start (ST1), a load of the word processor is first effected (ST2). Then, index, document name such as title are entered and a text file TF is read out of the external memory unit 11 (ST3). The read out text file is stored in the main memory unit 2. Then, an address and one or more modified characters are entered by means of the keyboard 6 (ST4). Then the past-record file PRF, representing the mutual relation between the address and modified characters is formed. In this case, when the relevant address has not been recorded on the past-record file, a modified character is denoted by operating a character key (ST5). Next, a content of the text file TF is displayed on the display device 7 (ST6) and the operator can confirm it. Then, the operation pushes the conversion key 10 on the keyboard 6 to initiate the conversion (ST7). All characters in the text are identified one (ST8) by one, and when a character which is assigned to be replaced by a modified character is found, a code or address of a corresponding modified character is read out of the modified character memory 5 and is substituted for a code or address of the relevant standardized character (ST9). After the conversion for a first page of the text has been finished, a next page of the text is read out and the conversion is performed in the same manner as than explained above. After all pages of the relevant document have been converted, an output file for the relevant address is closed to form the text file having the modified characters TFMC (ST11).

Next, after an address and modified characters have been entered, the conversion key 10 is pushed again to form a text file TFMC having the relevant address and modified characters. After all text files with respective addresses and modified characters have been formed (ST12), all the files such as text file, modified character file and past-report file are closed, and the process is ended (ST14).

It should be noted that the present invention is not limited to the embodiments explained hereinbefore, but many modifications and alternations can be conceived within the scope of the invention. For instance, in the above embodiment, the different modified characters are allotted to respective documents having different addresses. In case of delivering a plurality of documents with the same content to the same address, it is possible to assign different modified characters to respective documents. Moreover, it is also possible to allocate different modified characters for respective word processors in order to identify a word processor whose document is leaked. In this manner, the management of documents can be performed effectively to keep the classified information secret.

In the above embodiment, after the text file has been formed by the standardized characters, particular modified characters are allocated. It is also possible to prepare and store a corelation table denoting mutual relation between addresses and modified characters. Then given modified characters can be automatically selected merely by entering addresses.

Moreover, in the above embodiment, the text file wiht the modified characters is formed and the character information of the thus formed file is supplied to the printer device to form a document including modified characters. According to the invention, the printer device may be provided with a function to type out selectively modified characters to form documents including the modified characters. In such a case, it is not necessary to form the text file with the modified characters, but only the ordinary text file with the standarized characters is sufficient.

In the embodiment explained above, the modified characters are formed by the operator just like as the additional character registration, but the modified characters may be previously stored in a ROM.

In the above embodiment, predetermined characters are replaced by the modified characters, but it is possible to assign undetermined characters are modified characters. For instance, all characters or a part of characters on the first line of the first page of a document may be formed as the modified characters by, for example cutting a part of these characters as illustrated in FIG. 4A.

In the embodiment so far explained, the document is outputted by means of the printer device. According to the invention, it is possible to send the document information as an information signal over a data transmission path and the document is formed by a recording device provided at a receiver end. In this case, at the transmitter end the text file with the modified characters is formed and at the receiver end the received information signal is reproduced as it is or at the transmitter end the text file with the standardized characters is formed and at the receiver end, a document is printed out after the received ordinary text file has been converted into the text file with the modified characters. Particularly, in the latter case, the designation of the modified characters may be effected either one of the transmitter end and the receiver end. Moreover, the document information may be recorded on a floppy disc which is then set to a floppy disc drive of another word processor to print out a document with the modified characters. It should be further noted that the word processor according to the invention is not limited to that which can handle the words and marks, but the general conception of the information processor according to the invention should be interpreted much broader such that a processor which can process figures and pictures is also within the scope of the invention.

Further, the basic conception of the present invention can be equally applied to a usual electronic typewriter. For instance, when use is made of a daisy wheel comprising a number of characters, some modified characters may be additionally provided on the daisy wheel. When a character is printed as a modified one, a corresponding modified character is printed instead of the standard character.

In the information processor according to the invention, it is possible to distinguish a plurality of documents having the same content from one another by including one or more specially modified characters in respective documents, so that persons who possess or keep the documents or who have a responsibility in managing the documents or who have a responsibility in managing the documents have to enhance the management of classified documents, because if a document is lost, it can be easily identified a person who is responsible for the intelligent leak, and if a duplicated document is opened to public or found at third parties, it can be easily investigated whose document was duplicated. In this manner, according to the information processor of the present invention, it is possible to effectively protect classified documents from the steal, flow-out and duplication.

It should be noted that the information processor according to the invention can be realized without changing existent word processors to a great extent, and thus can be practiced at a low cost.

What is claimed is:

1. An apparatus for processing information such as words, figures and pictures to facilitate tracing the source of origin of a copy of a document, comprising:
    first memory means for storing character information comprising characters including letters, numbers, punctuation marks, symbols, figures and pictures, each character having an inherent meaning;
    input means, connected to said first memory means, for entering selection commands for formatting the character information if accordance with a form of a desired document;
    display means, connected to said first memory means, for reading characters denoted by and selection commands out of said first memory means and for displaying the read out characters;
    second memory means, connected to said display means for storing text information including characters read out and displayed by said display means;
    first output means, connected to said second memory means, for outputting the text information stored in said second memory means;
    conversion means, connected to said second memory means, for modifying selectively a configuration of at least one character in said text information in such a way that said inherent meaning of said at least one character and a textual content of said text information are not altered, but the source of origin of versions of said text is encoded in said modified character configuration: and, second output means connecting said conversion means to said second memory means for inserting said at least one modified character configuration in said text information stored in the second memory means, so that said first output means presents a modified copy of a document including such encoded origin information, wherein the character configuration modification is detecable only upon close visual inspection; thereby allowing an investigator to trace and find the source of said copy of said document including the modification when said document was improperly disclosed.

2. An apparatus according to claim 1, wherein said input means comprises a keyboard including character keys for entering the selection commands and function keys.

3. An apparatus according to claim 2, wherein said conversion means comprises a memory for storing a set of modified characters, and a conversion key provided on said keyboard for entering a conversion command in response to which said at least one character in the text information stored in said second memory is replaced by at least one modified character.

4. An apparatus according to claim 3, wherein said conversion means generates a signal for replacing a character denoted by a corresponding character key on the keyboard by a corresponding modified character.

5. An apparatus according to claim 3, wherein said memory in the conversion means stores modified characters entered by a user.

6. An apparatus according to claim 3, wherein said memory in the conversion means comprises a read only memory in which the modified characters have been previously stored.

7. An apparatus according to claim 1, wherein said conversion means converts a character having a curved stroke into a modified character whose curved stroke has a different radius of curvature than that of a standardized character pattern.

8. An apparatus according to claim 1, wherein said conversion means converts a character including a straight stroke into a modified character whose straight stroke has a different inclination angle than that of a standardized character pattern.

9. An apparatus according to claim 1, wherein said conversion means converts a character composed of at least two separate elements into a modified character whose separate elements have a different positional relation than that of a standardized character pattern.

10. An apparatus according to claim 1, wherein said conversion means converts a character into a modified character which includes a branch in addition to a standardized character pattern.

11. An apparatus according to claim 1, wherein said conversion means converts a character into a modified character which has a different thickness than that of a standardized character pattern.

12. An apparatus according to claim 1, wherein said conversion means converts a character into a modified character whose position is changed with respect to adjacent characters having standardized character pattern.

13. An apparatus according to claim 1, wherein said conversion means converts a character into a modified character which is tilted with respect to adjacent characters having standardized character pattern.

14. An apparatus according to claim 1, wherein said conversion means comprises a memory for storing a correlation file which denotes a relationship between sadi modification of configuration of said at least one character and a delivery address of a respective document, and means for automatically selecting said modification of configuration of said at least one character in accordance with said correlation file.

15. An apparatus according to claim 3, wherein said output means comprises a printer for printing out a document under control of the text information.

16. An apparatus according to claim 15, wherein said conversion means forms a text file with modified characters, and said printer prints out a document under control of said text file with modified characters.

17. An apparatus for processing information such as words, figures and pictures to facilitate tracing the source of origin of a copy of a document, comprising:
first memory means for storing character information comprising characters including letters, numbers, punctuation marks, symbols, figures and pictures, each character having an inherent meaning;
input means, connected to said first memory means, for entering selection commands for formatting the character information in a form of a desired document;
display means, connected to said first memory means, for reading characters denoted by said selction commands out of said memory means and for displaying the read out characters;
second memory means, connected to said display means, for storing text information of a document including characters read out and displayed by said display means;
first output means, connected to said second memory means, for outputting the text information stored in said second memory means;
conversion means, connected to said second memory means, for selectively converting at least one character in said text information into a modified character by deleting a part of its standardized character pattern stored in the first memory means, in such a way that said inherent meaning of said at least one character and a textual content of said text information are not altered, but the source of origin of versions of said text is encoded in said modified character configuration; and, second output means, connecting said conversion means to said second memory means for inserting said at least one modified character configuration in said text information stored in the second memory means, so that said first output means presents a modified copy of a document including such encoded origin information, wherein the character configuration modification is detectable only upon close visual inspection; thereby allowing an investingator to trace and find the source of said copy of said document including the modification when said document was improperly disclosed.

18. An apparatus for processing information such as words, figures and pictures to facilitate tracing the source of origin of a copy of a document, comprising:
first memory means for storing character information comprising characters including letters, numbers, punctuation marks, symbols, figures and pictures, each character having an inherent meaning;
input means, connected to said first memory means, for entering selection commands for formatting the character information in a form of a desired document;
display means, connected to said first memory means, for reading characters denoted by said selection commands out of said memory means and for displaying the read out characters;
second memory means, connected to said display means, for storing text information of a document including characters read out and displayed by said display means;
first output means, connected to said second memory means, for outputting the text information stored in said second memory means;
conversion means, connected to said second memory means, for modifying selectively a configuration of at least one character of said document, in such a way that said inherent meaning of said at least one character and a textual content of a document are not altered, but the source of origin of versions of said text is encoded in said modified character configuration; and wherein said conversion means further comprises means for forming a correlation table representing a relationship between said modification of configuration of said at least one character and a delivery address of a respective document; and, second out means connecting said conversion means to the second output means for inserting said at least one modified character configuration in said text information stored in the second memory means, so that the first output means presents a modified copy of a document included such encoded origin information, wherein the character configuration modification is detectable only upon close visual inspection; thereby allowing an investigator, with the use of a correlation tabled, to trace and find the source of said copy of said codument including the modification when said document was improperly disclosed.

19. An apparatus according to claim 18, wherein said conversion means further comprises means for forming a past-record file under control of said corelation table.

* * * * *